United States Patent [19]

Johnson

[11] 3,967,880

[45] July 6, 1976

[54] ADVERTISING AND SALES PROMOTION METHOD AND APPARATUS

[76] Inventor: Frank Johnson, Deerfield Road, Lake Katonah, R.F.D. No. 3, Katonah, N.Y. 10536

[22] Filed: Sept. 18, 1974

[21] Appl. No.: 506,939

Related U.S. Application Data

[62] Division of Ser. No. 249,710, May 2, 1972, Pat. No. 3,844,057.

[52] U.S. Cl. .................................. 350/133; 350/134

[51] Int. Cl.[2] .......................................... G02B 27/22

[58] Field of Search .................. 40/106.22; 350/133, 350/134

[56] References Cited

UNITED STATES PATENTS 3,050,870 8/1962 Heilig .............................. 350/133 X

*Primary Examiner*—Paul A. Sacher

*Attorney, Agent, or Firm*—Julian Caplan

[57] ABSTRACT

Herein disclosed is a method and apparatus to advertise and promote the sales of certain consumer goods by accompanying the visual presentation or display of a product with the distinctive odor or smell which is characteristic of its use or preparation or consumption, said odor not necessarily being usually and normally present during such presentation or display. Such simultaneous visual and olfactory recognition serving to stimulate and enhance the sense of immediate or anticipated enjoyment and desire for goods so presented or displayed to prospective customers, thus encouraging the purchase and use or consumption or enjoyment of goods so advertised or promoted for sale.

3 Claims, 6 Drawing Figures

ADVERTISING AND SALES PROMOTION METHOD AND APPARATUS

This application is a division of application Ser. No. 249,710 filed May 2, 1972, now U.S. Pat. No. 3,844,057.

STATE OF THE ART

My invention concerns a technique and apparatus or device for advertising or promoting the sales of certain consumer goods by providing for the presence of the distinctive and characteristic odor or smell of such goods simultaneous with the visual display or presentation of such goods to prospective customers. Through such simultaneous visual and olfactory stimulation and sensations, my invention will serve to enhance and motivate desire for products so presented or displayed and thus increase the same and use or consumption of enjoyment of such goods.

My invention is concerned with goods having a great range of inherent properties, including either the presence or absence of a smell characteristic of such goods when advertised or promoted or presented for sale, therefore the concept or principle of my invention is capable of several aspects or forms so as to successfully advertise or promote the sales of such diverse goods or products.

In a preferred form of the invention the advertising or sales promotion medium or technique presents or displays the goods away from the point of retail sale or display and consists of delivery of a device or apparatus to the home or office of a preselected prospective customer for a particular product. This device is in the form of an inexpensive stereoscopic picture viewer, together with photographic images of the goods being advertised or promoted, an example being a line of new automobiles. When the prospect operates the stereo viewer and looks at the photographic images, in this example, the single-cycle action of a mechanism which I have invented, being enclosed within the stereo viewer, provides for the controlled release and dispensing of an odor which would be that of a "new car smell". Thus the viewing of stereo images of a line of new cars in the semi-privacy of a home or office by a prospective customer is accompanied simultaneously with the sensory stimulation and pleasure of a new car smell as if the prospect were physically at the salesroom of a new car dealer or inside a demonstration model of a new car line or the like.

My invention provides that the visual perception of products or of the images of products is accompanied and enhanced by simultaneous olfactory perception of an odor or smell characteristic of such products.

It will be apparent in describing the various aspects or forms of my invention that the words "presentation" or "visual presentation" or "visual perception" or "visual display" or "visual" or the like apply both to the physical presence and display of certain products, or alternatively to the display or presentation of an image or images of such a product, such as a film slide or a graphic or photographic image.

It is well known in the art of advertising and sales promotion that certain products with which my invention is concerned usually generate or dispense their most appealing and characteristic odor or smell during processing or preparation, and prior to packaging and distribution to retail outlets or stores or the like for display or presentation and sale. Freshly baking bread or freshly ground roast coffee beans are examples of such products and of their preparation prior to packaging.

Certain other products do not usually generate or dispense their most appealing and characteristic odor or smell until they have been purchased at a retail outlet or store or the like and taken into the home. During the heating or cooking process in preparation for use or consumption, after such products have been removed from their packaging, they generate or dispense their most appealing and characteristic odor or smell. Frying bacon or baking frozen pizza pie are examples of such products and of their preparation in the home.

Still other products with which my invention is concerned usually generate or dispsense their most appealing and characteristic odor or smell during normal presentation or display for sale at a retail outlet or the like. A retail display of ripe bananas with its characteristic smell, or presentation and display of a line of new automobiles with their distinctive new car smell are examples of such products.

It is also well known in the art of advertising and promoting the sales of the aforementioned diverse consumer goods that separate stimulation of the senses of prospective customers with the sight or with the smell of such goods, even when such separate sensory stimulations are totaled together in their effect, does not equal the effect of the simultaneous stimulation of the senses of prospective customers with both the sight and the smell of such goods. This is true whether such simultaneous sight and smell sensory stimulation of prospective customers occurs in the physical presence of such goods or away from the physical presence of the goods.

As a consequence of this knowledge in the aforesaid art, and of the sales advantages to be gained from the simultaneous presentation of the sight and the smell of certain consumer goods, many different attempts and methods to accomplish this extremely desireable advertising and sales promotion technique have been undertaken. Such attempts have previously met with varying degrees of success and with universal serious and expensive and bothersome disadvantages and drawbacks.

Typical of the state of the art in advertising and sales promotion of a product whose physical presence does provide for simultaneous visual and olfactory sensory stimulation to prospective customers, such as a line of new automobiles for example, is the technique of providing for a display of new model cars or a demonstration ride in a new model car. Thus the prospect is exposed to or surrounded with the simultaneous sensory stimulation of both visual perception and olfactory perception of new cars through his sense of sight and his sense of smell. This technique is somewhat comparable to that of in-store sampling for certain products.

While this technique of product display and a demonstration can be both useful and effective, it also has serious and expensive drawbacks and disadvantages for both the manufacturer and the retailer. There is the need for a display salesroom, and for display and demonstration models of the new car line, in this example. There is also the need for expensive mass media use to inform and persuade prospective customers to visit the salesroom of a particular new car dealer, or to arrange for a demonstration ride. At best, costly mass media advertising can usually highlight only a few models or features of a new car line. Even at the retail outlet or salesroom, the variety of new car models and their features which can be displayed is limited to available space.

There is also an advertising technique in the present state of the art whereby a printed advertisement can display both the sight or image of a product together with the limited capability of presenting the characteristic smell of said product. Through this technique, tiny capsules which are invisible to normal eyesight enclose microscopic portions of certain odor essences. These micro-capsules are then mixed into printing ink, or into a neutral carrier, and applied to areas of printed advertisements.

The reader of such an advertisement is instructed to scratch an indicated area of the ad, thereby breaking some of the micro-capsules and releasing the odor essences contained in them. He is instructed to then quickly raise the scratched area to his nose and "sniff", thereby detecting and perceiving the sensory stimulation from the characteristic odor or smell of that product so advertised or promoted.

While this technique has proved to be somewhat useful and effective for certain specialized products such as perfume and cosmetics, it also has many serious drawbacks and disadvantages. It is very expensive to produce an advertisement of this kind. The requirement of scratching the ad in a certain area and then raising and sniffing it discourages many readers. The maximum potential from an enhanced desire for a product, when unobtrusively and without a conscious act a prospective customer is stimulated by simultaneously perceiving both the sight and the characteristic smell of said product, is largely lost by the requirements of reading and understanding and consciously acting to follow detailed instructions. In addition, this particular technique is both difficult and costly to adapt to the advertising and promotion for most consumer goods at the retail point of sale or display or the like.

OBJECTS OF THE INVENTION

It is accordingly a primary object of my invention to avoid the serious and expensive disadvantages and drawbacks which are inherent in the aforedescribed well known practices and techniques in the art of advertising and sales promotion, as well as other methods well known and familiar but not aforedescribed. Instead, the concept and principle of my invention, in its several aspects or forms, will serve to simply and inexpensively increase and enhance the sales of diverse consumer goods whether prospective customers are present at a retail outlet or sales location or the like, or away from said retail sales location in the semi-privacy of a home or office or the like. My invention accomplishes this object by providing for the accompaniment of a visual display of certain goods with the simultaneous presence of the most appealing and characteristic odor or smell usually associated with the use or preparation or consumption of such goods. My invention thus provides for a prospective customer to be sensorily stimulated by both the sight and the smell of certain goods at one and the same time, so as to enhance the motivation and desire to purchase and use or consume or enjoy the goods so displayed.

In one aspect or embodiment of my invention concerned with semi-private presentation of advertising or sales promotion, using the example of advertising a line of new cars, it is an object of my invention to entice the prospect to view the various models and features and competitive advantages of said new car line in his home or office or the like. this is accomplished by delivering an inexpensive stereoscopic viewing machine to the prospect without charge, together with a plurality of stereo scenes or images of the new car models and features and the like. While the prospect is viewing said stereo scenes, my invention provides that he is also exposed to the added enjoyment and pleasure and simultaneous sensory stimulation of an accompanying new car smell, said smell heretofore only usually present in or immediately adjacent to an actual new car and not in a home or office or the like. Said pleasurable sensory stimulation serving to entice the prospect into viewing the advertised competitive features included in the plurality of stereo scenes which accompany said stereo device.

It is another object of my invention that such simultaneous presentation of a visual display and an olfactory presence be accomplished both unobtrusively and without any conscious act or foreknowledge of the prospective customer. My invention thus provides for the pleasure and enjoyment and enhanced sensations which such unanticipated simultaneous sight and smell, or the illusion of one or the other or both, serves to create in the mind of the prospect so viewing and smelling said stereo scenes at one and the same instant of time.

Another object of my invention is that such odor or smell as desired be provided and controlled as to its presence or absence, and that the odor be controlled and regulated as to strength and intensity and as to the duration and area of its detection and recognition.

Another object of my invention is to provide for automatic control as to the release and dispensing of the desired odor or smell. In the aspect of my invention concerned with the aforementioned stereo viewer, the release and subsequent dispensing of the desired odor is controlled through the one-cycle operation of an odor release and dispensing mechanism whereby there occurs a one time release of the odor. Said released odor is subsequently controlled as to duration and strength and area of detection, said area being in close proximity to the nostrils of a prospect operating and using the aforementioned stereo viewing device.

The above objects, and other objects and features and advantages of the stereoscopic viewer form or embodiment of my invention will be apparent from the later detailed drawings and description of said embodiment.

The aforesaid objects and features and advantages of my invention in its several forms or aspects will be apparent from the detailed description which follows in conjunction with the accompanying drawings:

DESCRIPTION OF THE INVENTION

Figure 1:
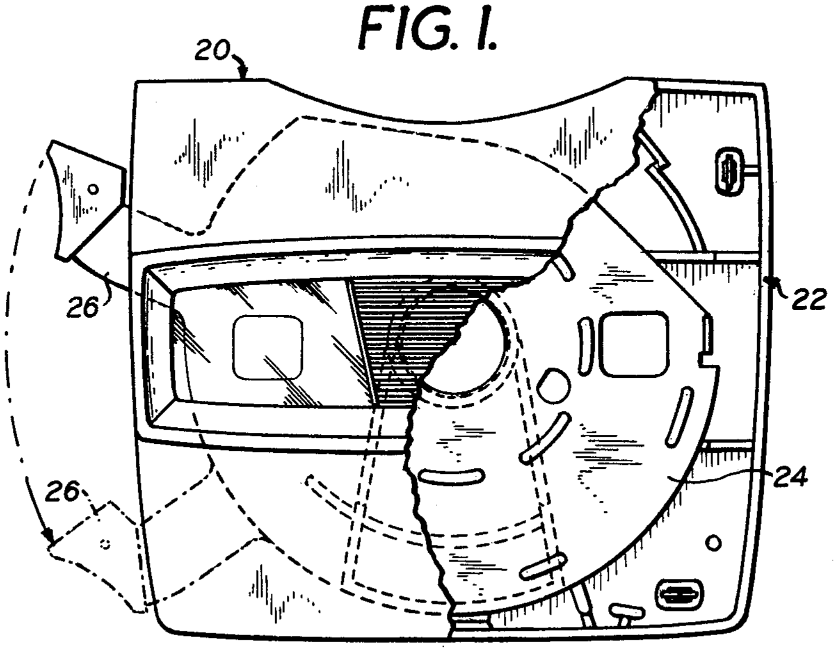
FIG. 1 is an elevational view of the stereoscopic viewer embodiment of my invention, partly broken away to illustrate the concerned portion of the modified section of the device. Phantom lines indicate the concerned compartment behind the metal film image advance ring.

Referring to FIGS. 1–6 in the drawing, there is illustrated a stereoscopic viewing device embodiment of my invention in an aspect useful in connection with a single-cycle action advertising or sales promotion technique and apparatus.

Implementation of the stereo viewer technique and embodiment of my invention provides for the delivery without cost to a preselected prospect of an improved and modified stereoscopic viewing device of the type sold under the trademark of GAF "VIEW-MASTER'. Said improved device containing an odor releasing and dispensing mechanism and means to operate same. Together with said improved device, the prospect is provided with a plurality of film slides or transparencies positioned in a disc-shaped film slide holder for viewing stereoscopically in said stereo device.

Upon viewing said stereo scenes in the improved device, the prospect operates a mechanism which, without his conscious knowledge, provides for the release and dispensing to the nostrils of the prospect an odor which is characteristic of the product or goods so presented in the stereo device. Thus the prospect will enjoy simultaneously the stereo images of certain goods together with their characteristic odor or smell, and so be sensorily stimulated as regards both present and anticipated desire to purchase and use or consume the goods so presented. In this form or embodiment, therefore, my invention becomes an inexpensive advertising or sales promotion medium or technique for presenting certain consumer goods to selected prospects, of which the aforementioned presentation of a new car line is an example.

Accordingly, in common with another form or embodiment of my invention to be subsequently described, the stereo viewer device improvement and modification incorporates the primary feature of my invention, such broad feature being a mechanism which includes a pouch containing an odor-producing liquid, means for opening the pouch by a penetration or slitting action and absorbent material for receiving and absorbing the odor-liquid as it is released from its pouch container so as to flow onto said absorbent material, thus providing means for vaporizing the odor essences from the odor-liquid and means for dispensing said vapors. Such apparatus and means for operating same being automatic and providing means for control and regulation as to the presence or absence of the desired odor and as to the strength and area of detection and duration and recognition of said odor vapors.

There will be seen in FIGS. 1–6 a stereo viewer 20 generally comprising a housing formed from two interfitting sections. In the forward section of said stereo viewer with which my invention is concerned, designated 22, there is positioned a pair of viewing lenses (not shown). In the other interfitting section, as illustrated, there is positioned a pair of corresponding openings for admitting light to said lenses. Said light-emitting interfitting section constitutes no part of my invention which improves and modifies the aforementioned type of stereo viewing device.

However, it will be understood that in the light-admitting section of the stereo viewing device there is provided a suitably shaped opening and cavity to receive and properly position a disc-shaped film slide holder (not shown) for stereo viewing. This disc-shaped film slide holder contains 14 frames or film transparencies, thus providing for the viewing of seven separate stereo scenes with each scene consisting of two separate film frames which combine to form a single stereo scene in the visual image of the user.

Figure 2:
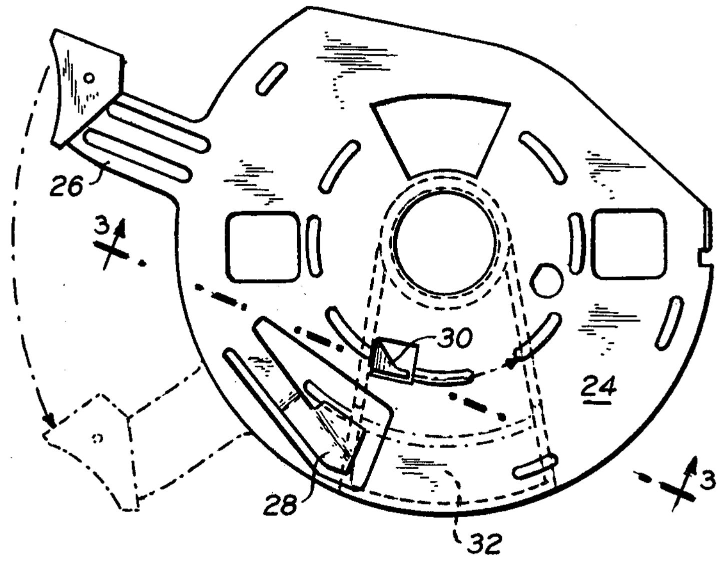
FIG. 2 is a view of the metal film image advance ring and the attached finger lever, showing the modification which provides for a knife-like mechanism.

Operation of the stereo viewing device as thus far described, and without improvement and modification by my invention, provides for downward pushing of the finger lever 26 which is part of the metal disc 24 within the housing 20, and is positioned on the left as seen in FIGS. 1 and 2. Said finger lever 26 is normally on the right, from the position of a user looking into the viewing lenses while operating the device. Such downward movement of the finger lever 26 causes rotation of the metal disc 24, as may be seen by reference to the dotted line — arrow indication in FIGS. 1 and 2, said metal disc being spring biased to enable it to return to its normal upper position.

The metal disc 24 includes a projection 28 which engages successively in slots at the edge of the disc-shaped film slide holder. Rotation of the metal disc 24 thus advances said film slides so as to position another stereo scene for viewing by the operator of the device.

Figure 3:
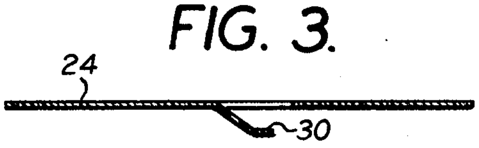
FIG. 3 is a horizontal sectional view of the metal film image advance ring taken on the line 3—3 of FIG. 2, illustrating the depression of the knife-like mechanism.

As an integral part of the improvement and modification of the stereo viewer 20, so that said viewer is useful as an advertising and sales promotion device incorporating the dispensing of a desired odor to accompany the viewing of desired stereo images, my invention improves and modifies the metal advance ring 24 as will be seen in FIGS. 2 and 3. My invention also improves and modifies the existing compartment 32 as will be seen by reference to FIGS. 4 and 5.

As will be seen in FIG. 2, the metal advance ring 24 is modified by stamping out from it a knife-like mechanism 30, or by attaching such a mechanism to said metal advance ring. The depressed shape and position of the knife 30 is illustrated in a sectional view of the metal advance ring 24 as will be seen in FIG. 3. Such shaping and position providing for a penetrating and slitting action of the knife 30 as later described.

Figure 4:
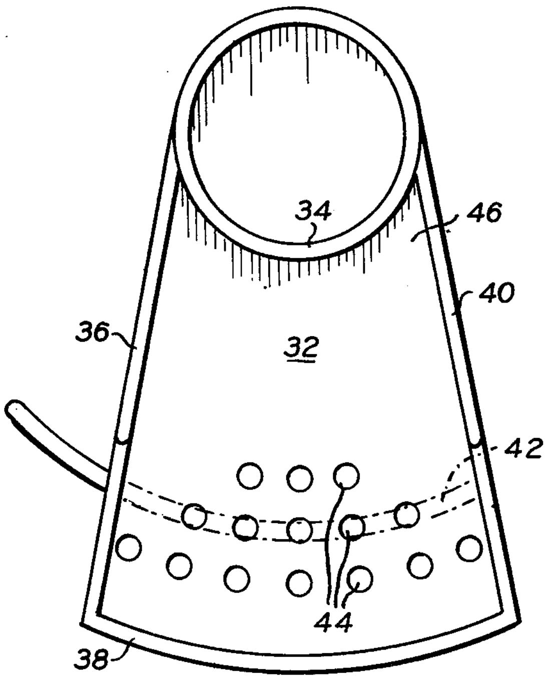
FIG. 4 is an enlarged view of the concerned compartment of the stereo device, illustrating the removed section of an interior wall and the perforations through the casing wall which provide for passage of the desired odor vapors into the atmosphere.

In FIG. 4 will be seen the modifications of the existing compartment 32, said compartment being indicated by phantom lines in FIGS. 1 and 2. Modifications include removal of the arcuately extending interior wall 42, as indicated by the phantom lines in FIG. 4. Additionally, it will be seen in FIG. 4 that suitable holes or perforations, designated 44, are provided in the front portion of the housing 20, said holes passing through the exterior wall 46 of the compartment 32. These holes or perforations provide for dispensing the vaporized odor essences into the atmosphere as will be described later.

Figure 5:
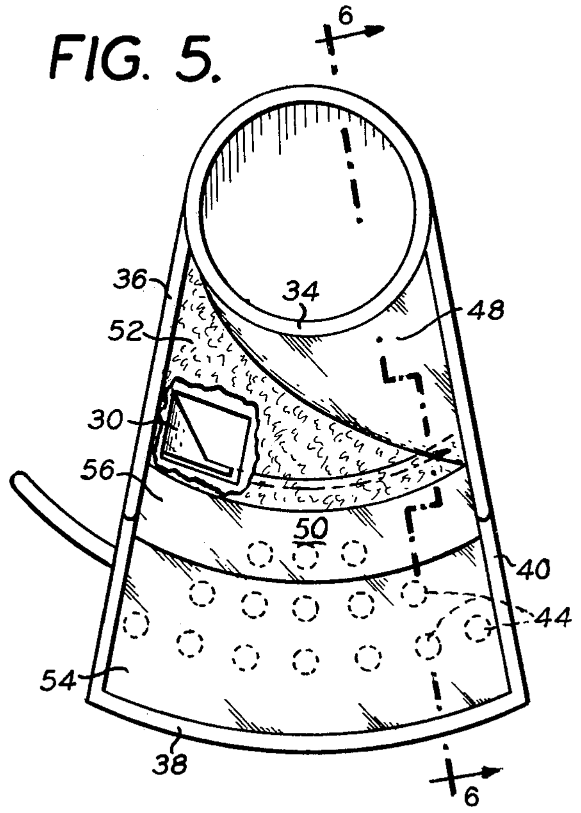
FIG. 5 is another enlarged view of the concerned compartment, illustrating the odor containing and releasing and dispensing mechanism and means as positioned within said modified compartment.

FIG. 5 particularly illustrates the improvements in the modified compartment 32, said compartment being bounded by the exterior wall 46 and by interior radially extending walls 36 and 40, as well as arcuately extending top wall 34 and bottom wall 38. As will be seen by reference to FIG. 5, a pouch containing a predetermined quantity of odor producing liquid is adapted to be fitted in the upper right hand corner of modified compartment 32 and to be firmly attached to the exterior wall 46. The knife 30 fits into the modified compartment 32 in the position shown, and a pad of absorbent material 50 is disposed within the modified compartment 32, said pad also being firmly attached to the exterior wall 46.

It should be noted that crushed and molded fibrous material such as contained in common paper towels has been found to be a useful composition of the absorbent pad 50. Said material will absorb the provided amount of odor-liquid and retain it so as to provide for a predetermined rate of vaporization of the aforementioned odor essences. Such material will perform this action without swelling or otherwise changing shape or interferring in any manner with the normal operation of the stereo viewing device 20.

Figure 6:
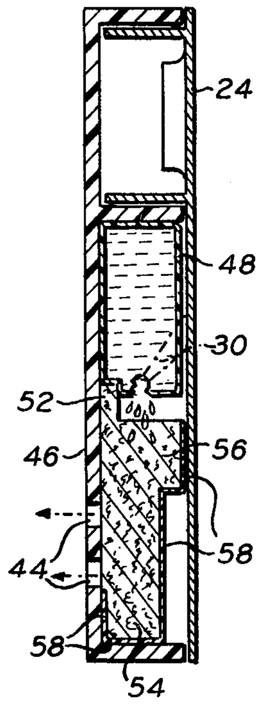
FIG. 6 is a sectional view of the modified compartment taken on the line 6—6 in FIG. 5, illustrating the configuration of the absorbent material and the coating applied to certain areas of said absorbent material.

Said absorbent pad is specially shaped, as will be seen in FIGS. 5 and 6, so as to perform at least two essential functions. The first function being to accomodate the pouch 48, to absorb the odor-liquid released from said pouch, to provide for vaporization of odor essences from said liquid, and to promote the passage of said vapors into the atmosphere through the perforations 44, located behind said absorbent material 50. It will thus be appreciated that pouch 48 is so positioned, and the entire pad of absorbent material 50 is so configured and positioned as to provide for maximum absorption of the odor-liquid by the absorbent pad 50 when the pouch 48 is opened in the manner to be described.

The second function of the configuration of pad 50, as shown in FIG. 6, is accomplished whereby the thinnest portion 52 allows free passage over it for the arc of travel of the knife 30, the next thinnest portion 54 allows free passage over it for the arc of travel of the slide film advance projection 28 and the thickest portion 56 allows free passage over it for the arc of travel of the metal advance ring 24.

In the use and practice of this embodiment of my invention, the stereo device 20 is modified and improved as aforedescribed and delivered to the home or office or the like of a preselected prospect who will operate and use said stereo device for his own enlightenment. Upon initiation of the operating sequence of the device, that is by inserting one of the film slide discs which accompany the stereo viewer and depressing for the first time the finger lever 26, rotation of the metal disc 24 produced by said movement of the finger lever results in movement of the knife 30 in an arcuate path, as may be seen in FIG. 5. Accordingly, the point of the knife 30 pierces the pouch 48, and the extension of the knife slits open a portion of the pouch. The result is that the odor-liquid contained in the pouch 48 is released and flows from the pouch onto and is absorbed into the pad of absorbent material 50, as can be seen by referring to FIGS. 5 and 6.

It will also be seen in FIG. 6 that a thin coating designated 58, said coating being particularly resistant to the passage through it of either said odor-liquid or said vaporized odor essences, covers the rear facing areas of portions of the absorbent material designated 54 and 56, leaving the top facing portion of 56 and all of 52 open and not covered. Said coating 58 also covers the bottom facing portion of 54 and a small portion of the front facing portion of 54. The coating 58 thus serves to retain all of the released odor-liquid within the absorbent material 50. Presence of the coating 58 also serves to help regulate and direct the odor vapors outward from modified compartment 32 through the perforations 44 and into the atmosphere directly under or adjacent to the nostrils of a prospective customer using the improved stereo device 20.

The aforedescribed absorption of the odor-liquid into the absorbent pad 50, in the amount of approximately 1 cc of odor-liquid, and the subsequent regulated vaporization of the odor essences at a predetermined rate, provides for the sustained presence of the desired intensity or strength of said odor vapors for a time period in the order of 6 to 8 hours after the initial operation of the finger lever 26 by the preselected prospect.

Although not necessarily limited to a single instance of advertising or sales promotion, the stereo device aspect or form or embodiment of my invention as aforedescribed is considered to be especially adaptable, as previously alluded, to advertising or promoting the sales of a line of new automobiles. Accordingly, the odor which would be provided in such instances would be one which corresponds to the distinctive and characteristic new car smell. The accompanying film slide discs, of course, would contain images of models and features of said new car line and of various dealers salesrooms and the like.

It should be pointed out that nothing concerning the improvements and modifications of my invention as aforedescribed in this stereo viewer aspect will prevent the normal and usual operation and usefulness of said stereo device in the viewing of various film slide discs such as are sold for normal use in the unmodified and unimproved GAF VIEW-MASTER stereo viewers.

What I claim is:

1. Apparatus for enhancing the visual display or presentation of goods comprising a light-weight housing capable of being held in the hand, said housing including a portable stereoscopic viewing device adapted for viewing stereo scenes through means of a plurality of images of said goods placed within said housing, manually actuated means for advancing said images in said housing, container means for an odor producing liquid within said housing, an odor producing liquid characteristic of said viewed goods within said container means, said container means capable of being opened by a knife-like instrument to release said odor liquid, and a knife-like instrument opening means in said housing movable with said manually actuated means to open said container so that said odor liquid can run out of said container and said odor can vaporize and become recognizable in the atmosphere adjacent said apparatus.

2. Apparatus as defined in claim 1 further comprises a compartment within said housing, said compartment adapted to hold said container means and absorbent material under said container means and to contain said opening means and further including perforations through said compartment to the surrounding atmosphere, said perforations being capable of passage of odor vapors from said housing into the adjacent atmosphere.

3. Apparatus as defined in claim 2 further including a coating on the surface of portions of said absorbent material, said coating being resistant to passage through it of said odor producing liquid and odor vapors so as to provide means to further direct and control the presence and strength and area of detection of said odor vapors passing through said perforations into the adjacent atmosphere.

* * * * *